(12) United States Patent
Piccolo

(10) Patent No.: US 10,935,058 B2
(45) Date of Patent: Mar. 2, 2021

(54) DEVICE FOR FIXING A BLANK TO A MODULAR SUPPORT SYSTEM

(71) Applicant: HPT SINERGY S.R.L., Padua (IT)

(72) Inventor: Gabriele Piccolo, Camposampiero (IT)

( * ) Notice: Subject to any disclaimer, the term of this patent is extended or adjusted under 35 U.S.C. 154(b) by 0 days.

(21) Appl. No.: 15/500,749

(22) PCT Filed: Jul. 29, 2015

(86) PCT No.: PCT/EP2015/067415
§ 371 (c)(1),
(2) Date: Jan. 31, 2017

(87) PCT Pub. No.: WO2016/016324
PCT Pub. Date: Feb. 4, 2016

(65) Prior Publication Data
US 2017/0218988 A1    Aug. 3, 2017

(30) Foreign Application Priority Data

Aug. 1, 2014 (IT) .......................... PD2014A000211

(51) Int. Cl.
*F16B 37/02* (2006.01)
*F16B 5/02* (2006.01)
*F16B 43/02* (2006.01)

(52) U.S. Cl.
CPC .............. *F16B 5/025* (2013.01); *F16B 43/02* (2013.01)

(58) Field of Classification Search
USPC ........................................................ 411/537
See application file for complete search history.

(56) References Cited

U.S. PATENT DOCUMENTS 1,403,744 A * 1/1922 Dodds ....................... F22B 7/16
411/374
1,660,960 A * 2/1928 Greenslade .............. B21K 1/46
148/211

(Continued)

FOREIGN PATENT DOCUMENTS

DE        20317196 U1    1/2004
DE    202004012253 U1   12/2005

OTHER PUBLICATIONS

International Search Report dated Oct. 5, 2015 re: Application No. PCT/EP2015/067415; pp. 1-3; citing: US 5 020 951 A, DE 203 19 196 U1, DE 20 2004 012253 U1 and US 2005/079012 A1.

(Continued)

*Primary Examiner* — Gary W Estremsky
(74) *Attorney, Agent, or Firm* — Themis Law

(57) ABSTRACT

A device for fixing a blank to a modular support system includes a body having cylindrical symmetry which is provided at one end with a centering collar and, in a central region, with a perimetric recess that defines an engagement undercut for a corresponding locking component of a modular support system. The body has an axial through hole for a threaded fixing element. The axial through hole is open onto a coaxial seat for resting the head of the threaded fixing element, and it has a larger diameter than the outside diameter of the stem of the threaded fixing element. The head of the threaded fixing element has a resting surface, a substantially spherical geometry, and a smaller outside diameter than the corresponding internal dimension of the resting seat in which the threaded fixing element is accommodated.

5 Claims, 2 Drawing Sheets

(56) References Cited

U.S. PATENT DOCUMENTS

| | | | | | |
|---|---|---|---|---|---|
| 2,403,541 | A | * | 7/1946 | Molat | F16B 5/025 |
| | | | | | 411/368 |
| 3,382,630 | A | * | 5/1968 | Chivers | B64C 1/1492 |
| | | | | | 411/537 |
| 4,860,513 | A | * | 8/1989 | Whitman | E04D 3/3603 |
| | | | | | 52/410 |
| 5,020,951 | A | | 6/1991 | Smith | |
| 5,542,777 | A | * | 8/1996 | Johnson | B61D 17/043 |
| | | | | | 403/384 |
| 2005/0079012 | A1 | | 4/2005 | Mochizuki | |
| 2013/0287519 | A1 | * | 10/2013 | Weiss | B60B 3/142 |
| | | | | | 411/147 |

OTHER PUBLICATIONS

Written Opinion dated Oct. 5, 2015 re: Application No. PCT/EP2015/067415; pp. 1-6; citing: US 5 020 951 A, DE 203 19 196 U1, DE 20 2004 012253 U1 and US 2005/079012 A1.

* cited by examiner

ID OF A BLANK TO A
MODULAR SUPPORT SYSTEM

TECHNICAL FIELD

The present disclosure relates to a device for fixing a blank to a modular support system.

BACKGROUND

Nowadays, for the reversible locking of a blank for mechanical machining, such as processing to remove shavings, modular support systems are known which comprise a plurality of different components which are designed to be combined so as to provide a stable, secure and accurate support for keeping a blank in a precise preset position for access by the machine tools.

As a result of their practicality and functionality, modular support systems are known and are increasingly widespread which comprise a base plate which is provided with a matrix of seats for fixing contoured spacer components in order to support the blank in a preset position.

The fixing between a spacer component of a modular support system and the blank is provided, as shown schematically in FIG. 1, by way of a fixing device A which comprises a body having cylindrical symmetry B which has:

- at one end a centering collar C, which is adapted to be inserted in a complementarily shaped circular cavity D defined on the surface of the blank E,
- and, in a central region, a perimetric recess F which defines an engagement undercut for a spacer component G the latter provided with a central hole which is provided with reversible coupling means, which should be understood as being of known type, which are adapted to cooperate with the undercut in order to lock the body having cylindrical symmetry B.

Fixing the body having cylindrical symmetry B to the blank E occurs by way of a threaded element H which is arranged so as to axially pass through the body having cylindrical symmetry B and is adapted to be screwed to a threaded dead hole L which is specially provided on the blank E, coaxially to the circular cavity D for the centering collar C.

Such modular support systems, although widespread and appreciated, suffer a very important limitation which is linked to the frequent need to carry out further work on a blank after it has undergone one or more further thermal or chemical processes or treatments which have caused deformations in it, which are shown for example in FIG. 2, some of which are such as to determine angular deviations M, and in a radial direction N, of the axes P of the threaded dead holes L.

The deformations of the blank E at the threaded fixing dead holes L do not allow the correct repositioning of the same blank on the adapted modular support system; at present an attempt is made to overcome such drawback by re-centering the circular cavity D for the centering collar by way of slight boring or milling machining operations, so that it is as coaxial as possible with the axis of the threaded connecting dead hole, but nothing can be done about the angular deviation of the axis of such hole, since for reasons of cost and time linked to the economy of the process, it is not feasible to make new threaded holes at the pre-existing holes.

SUMMARY

The aim of the present disclosure is to provide a device for fixing a blank to a modular support system which is capable of overcoming the above limitation of conventional modular support systems.

Within this aim, the disclosure provides a device which is capable of solving the problems of the axis of a threaded fixing hole being offset with respect to its original position on the blank, without lengthy and expensive mechanical machining operations to restore the threaded holes L.

The disclosure further provides a device which adapts well to conventional modular support systems.

The disclosure also provides a device that is simple and intuitive to use and can be maneuvered with conventional tools.

These advantages which will become better apparent hereinafter are achieved by providing a device for fixing a blank to a modular support system, which comprises a body having cylindrical symmetry which is provided at one end with a centering collar and, in a central region, with a perimetric recess that defines an engagement undercut, wherein it has an axial through hole for a threaded fixing element, said axial through hole being open onto a coaxial seat for resting a head of a threaded fixing element, said through hole having a larger diameter than the outside diameter of the stem of said threaded fixing element, said head of said threaded fixing element having a resting surface for resting in said resting seat, having a substantially spherical geometry, said head of said threaded element having a smaller outside diameter than the corresponding internal dimension of said resting seat in which it is accommodated, said threaded element being free to translate radially with respect to the axis of said body having cylindrical symmetry and being free to rotate about the center of said substantially spherical surface of its head.

BRIEF DESCRIPTION OF THE DRAWINGS

Further characteristics and advantages of the disclosure will become better apparent from the description of a preferred, but not exclusive, embodiment of the fixing device according to the disclosure, which is illustrated by way of non-limiting example in the accompanying drawings wherein.

DETAILED DESCRIPTION OF THE DRAWINGS

Figure 1:
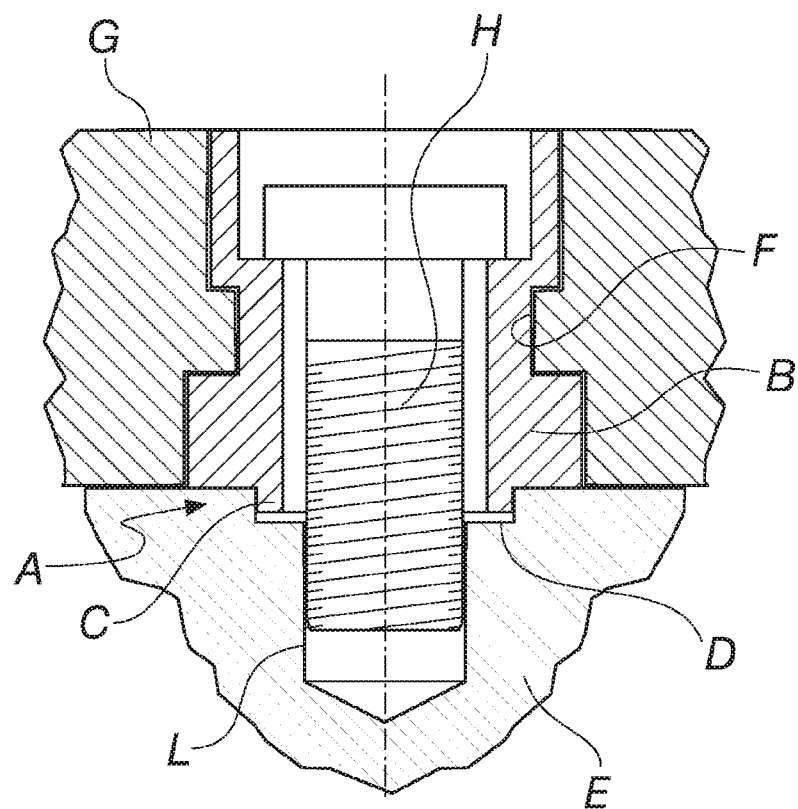
FIG. 1 is a cross-sectional side view of a conventional fixing device.
Figure 2:
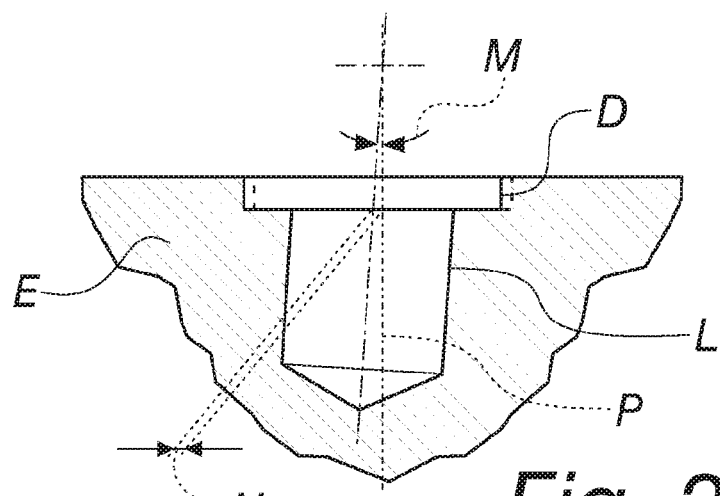
FIG. 2 shows an example of a situation in which deformation has occurred in a blank at a region for fixing to a device according to the disclosure.
Figure 3:
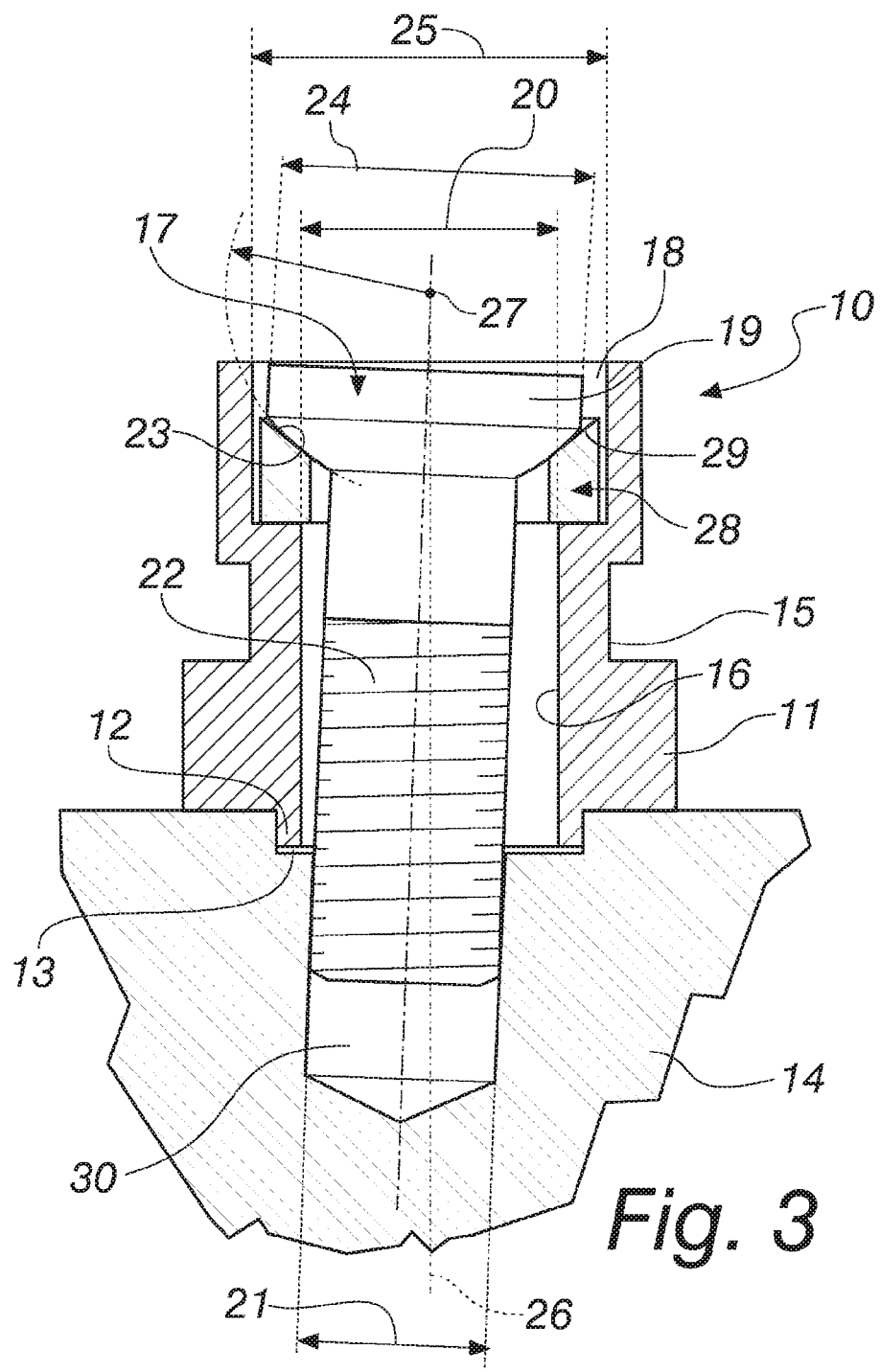
FIG. 3 is a schematic cross-sectional side view of a fixing device according to the disclosure.

With reference to the figures, a device for fixing a blank to a modular support system according to the disclosure is generally designated in FIG. 3 with the reference numeral 10.

The fixing device 10 comprises a body having cylindrical symmetry 11, which is provided at one end with a centering collar 12, to be arranged in a corresponding circular cavity 13 defined on the surface of a generic blank 14 to be held immobile.

The body having cylindrical symmetry 11 has, in a central region, a perimetric recess 15 which defines an engagement undercut for a spacer component of a modular support structure, which should be understood as being of conventional type, is not the subject matter of the present disclosure and for the sake of simplicity is not shown.

The peculiarity of the fixing device 10 according to the disclosure lies in the fact that it has an axial through hole 16 for a threaded fixing element 17.

The axial through hole 16 is open onto a coaxial resting seat 18 for a head 19 of the threaded fixing element 17.

The axial through hole 16 has a greater diameter 20 than the outside diameter 21 of the stem 22 of the threaded element 17.

The head 19 of the threaded element 17 is provided with a resting surface 23, for resting in the resting seat 18, having a substantially spherical geometry.

Furthermore, the head 19 of the threaded element 17 has a smaller outside diameter 24 than the corresponding internal dimension 25 of the resting seat 18 in which it is accommodated.

As a result of such peculiarity of the fixing device 10, the threaded element 17 is free to translate radially with respect to the axis 26 of the body having cylindrical symmetry 11, and is free to rotate about the center 27 of the substantially spherical surface 23 of its head 19.

Advantageously, in the resting seat 18 for the head 19 of the threaded element 17 there is, interposed between the head 19 and the bottom of the seat 18, a resting ring 28 which is provided with an adapted contact surface 29 which is contoured to facilitate the rotary motion of the spherical surface 23 of the head 19 of the threaded element 17.

The contact surface 29 is, for example, conical, or alternatively has a spherical extension with a radius substantially identical to the radius of the spherical surface 23 of the head 19.

The resting ring 28 has an inside diameter of dimensions which are such as to not interfere with the rotation of the stem 22 of the threaded element 17, and has an outside diameter that is smaller than the corresponding internal dimension 25 of the seat 18 for the head 19 of the threaded element 17, so as to ensure that it is possible for the threaded element 17 to translate radially with respect to the axial through hole 16.

Use of the fixing device 10 according to the disclosure is the following.

Once the centering circular cavity 13 for the collar 12 of the body having cylindrical symmetry 11 has been rectified by way of boring or milling, it is necessary and sufficient to arrange the body 11 therein with the collar 12 conveniently and correctly inserted, and subsequently to insert the threaded element 17, orienting it so that it can be screwed into the threaded dead hole 30 of the blank 14, adapting to the position that the hole 30 has assumed following the deformations underwent by the blank 14.

The orientation of the threaded element 17 is made possible by the radial extent of the axial through hole 16 of the body having cylindrical symmetry 11 and by the resting surface 23 of the head 19 of the threaded element 17, which allows the head 19 to work in a rotated position with respect to the axis 26 of the body having cylindrical symmetry 11.

The fixing device 10 is likewise easy to dismount and is obviously reusable.

The head 19 should be understood to be, for example, of the type with a hexagonal socket, which can be maneuvered with a conventional socket head wrench.

In practice it has been found that the disclosure fully achieves the intended advantages and objectives.

In particular, with the disclosure a device is provided which is capable of solving the problems of the axis of a threaded fixing hole being offset with respect to its original position on the blank, without lengthy and expensive mechanical machining operations to restore the threaded holes 30.

Moreover, with the disclosure a device is provided which adapts well to conventional modular support systems.

Furthermore, with the disclosure a device is provided which is simple and intuitive to use and can be maneuvered with conventional tools.

The disclosure thus conceived is susceptible of numerous modifications and variations. Moreover, all the details may be substituted by other, technically equivalent elements.

In practice the materials employed, provided they are compatible with the specific use, and the contingent dimensions and shapes, may be any according to requirements and to the state of the art.

The invention claimed is:

1. A fixing device for fixing a blank to a modular support system, the device comprising:
    a body having a cylindrical symmetry;
    a threaded fixing element,
    said body being provided at one end with a centering collar adapted for insertion into a corresponding circular cavity defined in the blank, and, in a central region, with a perimetric recess that defines an engagement undercut,
    said threaded fixing element having an outerly threaded stem and a head,
    said device further comprising an axial through hole for said threaded fixing element,
    said axial through hole being open onto a coaxial resting seat for resting the head of said threaded fixing element,
    said axial through hole having a diameter that is larger than an outside diameter of the stem of said threaded fixing element,
    said head having a resting surface for resting in said resting seat, a substantially spherical geometry, and a smaller outside diameter than a corresponding internal dimension of said resting seat in which said threaded fixing element is accommodated; and
    a resting ring interposed between the head and a bottom of the resting seat and having a contact surface on which the resting surface of the head rests, the contact surface of the resting ring being contoured to facilitate a rotary motion of the spherical surface of the head, said threaded fixing element being free to translate radially with respect to a longitudinal axis of said body having cylindrical symmetry and being free to rotate about a center of said substantially spherical surface of said head.

2. The fixing device according to claim 1, wherein said contact surface is conical.

3. The fixing device according to claim 1, wherein said contact surface has a spherical extension.

4. The fixing device according to claim 1, wherein said resting ring further includes an inside diameter of dimensions which do not interfere with a rotation of the stem of the threaded fixing element and further includes an outside diameter that is smaller than a corresponding internal dimension of the seat for the head.

5. The fixing device according to claim 3, wherein said spherical extension has a radius that is substantially identical to a radius of the spherical surface of said head.

* * * * *